(12) United States Patent
Campbell

(10) Patent No.: US 6,276,064 B1
(45) Date of Patent: *Aug. 21, 2001

(54) VIEWING WINDOW FOR SAW GUARD AND METHOD OF MAKING SAME

(75) Inventor: David C. Campbell, Bel Air, MD (US)

(73) Assignee: Black & Decker, Inc., Newark, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/838,055

(22) Filed: Apr. 16, 1997

Related U.S. Application Data

(62) Division of application No. 08/655,905, filed on May 31, 1996.

(51) Int. Cl.[7] .................................................. B29C 45/14
(52) U.S. Cl. ................................ 30/390; 76/112; 83/520; 264/252
(58) Field of Search ........................ 30/388–391; 83/478, 83/520, 544, 860, DIG. 1; 52/800.14; 264/252; 76/112

(56) References Cited

U.S. PATENT DOCUMENTS

| | | |
|---|---|---|
| 1,224,530 | 5/1917 | Goetzke . |
| 1,312,651 | 8/1919 | Walters . |
| 1,830,579 | 11/1931 | Wappat . |
| 2,795,248 | 6/1957 | Doerner . |
| 3,249,134 | 5/1966 | Vogt et al. . |
| 3,471,356 | 10/1969 | Kolb et al. . |
| 3,504,716 | 4/1970 | Bush et al. . |
| 3,805,658 | 4/1974 | Scott et al. . |
| 3,990,145 | 11/1976 | Rubin . |
| 3,998,254 | 12/1976 | Morin ................................ 144/35 R |
| 4,450,627 | 5/1984 | Morimoto . |
| 4,543,283 | 9/1985 | Curtze et al. . |
| 4,663,228 | 5/1987 | Bolton et al. . |
| 4,675,999 | 6/1987 | Ito et al. ................................ 30/124 |
| 4,823,511 | 4/1989 | Herliczek et al. .................... 49/404 |
| 4,830,804 | 5/1989 | Weaver . |

(List continued on next page.)

FOREIGN PATENT DOCUMENTS

| | | |
|---|---|---|
| 644011 | 4/1937 | (DE) . |
| 2938229 | 4/1981 | (DE) . |
| 3216063 | 11/1983 | (DE) . |
| 3875644 | 10/1988 | (DE) . |
| 3843236 | 6/1990 | (DE) . |
| 3926017 | 2/1991 | (DE) . |
| 40 38 415 A1 | 6/1992 | (DE) . |
| 9419239 | 5/1995 | (DE) . |
| 2164080 | 5/1988 | (GB) . |

OTHER PUBLICATIONS

Patent Abstract No. 1,099,860 by Wingard Ltd. "Shrinking Casings on Rear View Mirrors", p. 593, Divisions B4–B5.

(List continued on next page.)

*Primary Examiner*—Douglas D. Watts
(74) *Attorney, Agent, or Firm*—Shook, Hardy & Bacon L.L.P.

(57) ABSTRACT

A window assembly for a power tool has a glass plate with an upper surface, a lower surface, and a peripheral edge. The plate is configured to generally cover an aperture formed in the upper saw guard of the power tool. A plastic layer having a peripheral edge is positioned on the upper surface of the glass plate. A frame engages the peripheral edge of the glass plate and the peripheral edge of the plastic layer. The frame is adapted to be attached to the guard so that the window covers the aperture and allows viewing of the cutting tool by the power tool operator.

11 Claims, 2 Drawing Sheets

U.S. PATENT DOCUMENTS

| | | |
|---|---|---|
| 4,839,122 | 6/1989 | Weaver . |
| 4,999,147 | 3/1991 | Kojima et al. . |
| 5,068,076 | 11/1991 | Weaver et al. . |
| 5,082,515 | 1/1992 | Cartier et al. . |
| 5,171,508 | 12/1992 | Ishizu et al. . |
| 5,268,183 | 12/1993 | Garza . |
| 5,344,603 | 9/1994 | Jardin et al. . |
| 5,413,748 | 5/1995 | Garza . |

OTHER PUBLICATIONS

Patent Abstract No. 1, 120.476 by Donnelly Mirrors, Inc., "Vehicle Rearview Mirrors", p. 536, Divisions B4–B5.

Patent Abstract No. 1,253,604 by Landis & Gyr A.G., "Injection Molding Windows", p. 383, Divisions B4–B5.

Patent Abstract No. EP–26–123 by Saint–Gobain Industries, "Plastic Inter Layer For Glass or Glass–Plastic Laminates . . . ", p. 3, Refractories–Ceramics.

Patent Abstract No. EP–26–140 by Saint–Gobain Industries, "Small Glass or Plastic Substrates Covered with Polymer Foil . . . ", p. 3, Refractories Ceramics.

Patent Abstract No. EP–128–802 by Saint Gobain Vitrag., "Forming Cover Film on Concave Lens . . . ", p. 120 of European Patents Report.

Patent Abstract No. EP–234–632, "Forming Components With Glass Support . . . ," p. 145 of European Patents Report.

VIEWING WINDOW FOR SAW GUARD AND METHOD OF MAKING SAME

This application is a division of U.S. Ser. No. 08/655,905, filed May 31, 1996.

BACKGROUND OF THE INVENTION

This invention relates to a viewing window for a power tool guard and, in particular, a viewing window which allows an operator to see a moving cutting tool of the power tool.

One of the problems associated with the use of hand-held power tools is properly aligning the cutting tool of the power tool so that the desired cut is achieved. One particular type of power tool that this problem is especially prevalent with is a hand-held circular saw. When using a hand-held circular saw, an operator normally will draw a line on the workpiece indicating the direction and pattern of cut. Circular saws typically have an upper saw guide which encases an upper peripheral portion of the blade. This upper saw guide prevents the operator from seeing whether the blade itself is actually following the marked cut line. Therefore, problems arise when the user initially attempts to align the saw blade with the cut line and further continues as the user attempts to keep the blade tracking upon the cut line.

Attempts have been made in the past to allow the user of a saw to view the blade of the saw through the guide and thus determine if the blade is properly tracking along the desired cut line. One such device is disclosed in U.S. Pat. No. 4,450,627. This patent discloses a circular saw with a clear viewing window on the upper saw guard. The structure disclosed in this patent suffers from various disadvantages. More specifically, the window is disclosed as being made of a transparent plastic material. First, plastic materials typically are susceptible to being electrostatically charged such that dust particles are likely to be attracted to the plastic surface. Thus, dust particles generated during the sawing operation are attracted to the plastic window due to the window maintaining an electrostatic charge. As is apparent, this static-induced dust contamination of the transparent window results in the operator not being able to see the blade as it passes through the workpiece, thus preventing the window from being effective. An additional problem associated with plastic windows is the fact that they are more susceptible to being scratched if the window is wiped clean of dust particles. More specifically, attempting to wipe the window of dust particles with a cloth will result in the dust particles digging into the soft plastic material, thus resulting in marring and scratching of the window. This marring and scratching, again, will obstruct the operator's view of the saw blade through the window. Therefore, a window construction is needed which will reduce the problem of static-induced dust contamination and, further, which will be resistant to scratching during a manual cleaning operation of the window.

SUMMARY OF THE INVENTION

Accordingly, it is an object of the present invention to provide a viewing window for the guard of a power tool which is resistant to the collection of dust thereon due to static electricity.

It is another object of the present invention to provide a viewing window which can be easily cleaned of dust and other particles without marring or scratching the surface of the window.

A further object of the present invention is to provide a window with improved longevity for covering the aperture formed in the guard even if impacted by projectiles generated by the cutting tool or by external impacts to the tool housings (such as accidental drops).

Yet another object of the invention is to provide a method for making a scratch-resistant and static-induced dust contamination resistant viewing window that is efficient and cost-effective.

According to the present invention, the foregoing and other objectives are obtained by a window assembly having a glass plate with an upper surface, a lower surface, and a peripheral edge. The glass plate with the peripheral edge is configured to generally cover an aperture formed in a cutting tool guard. A plastic layer having a peripheral edge is positioned on the upper surface of the glass plate. A frame is adapted to be attached to the guard and engages the peripheral edge of the glass plate and the peripheral edge of the plastic layer. In a further aspect of the present invention, a method is provided for making a window assembly for a power tool. The method includes positioning a plastic layer on the upper surface of the glass plate. The plastic layer and the glass plate each have a peripheral edge and are configured to generally cover an aperture formed in a power tool guard. A frame is molded to engage the layer peripheral edge and the plate peripheral edge. The frame is adapted to be attached to the power tool guard so that the combined plastic layer and glass plate generally cover an aperture in the guard.

Additional objects, advantages and novel features of the invention will be set forth in part in the description which follows, and in part will become apparent to those skilled in the art upon an examination of the following, or may be learned by practice of the invention.

BRIEF DESCRIPTION OF THE DRAWINGS

In the accompanying drawings which form a part of this specification and are to be read in conjunction therewith and in which like reference numerals are used to indicate like parts in the various views.

DETAILED DESCRIPTION OF THE PREFERRED EMBODIMENTS

Figure 1:
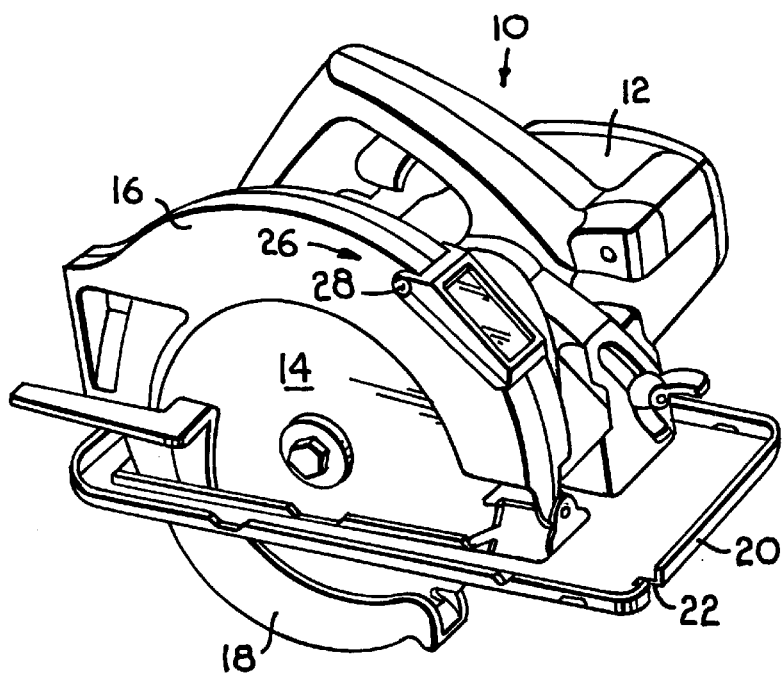
FIG. 1 is a top perspective view of a circular saw having a viewing window embodying the principles of the present invention.

Referring to the drawings in greater detail, and initially to FIG. 1, a power circular saw designated generally by the numeral 10 is shown. Saw 10 has a motor 12 which is operably attached to a circular saw blade 14. A power cord (not shown) supplies electrical power to motor 12. The upper portion of blade 14 is surrounded by an upper saw guard 16. Upper guard 16 is fixedly secured to motor 12. The lower portion of blade 14 is surrounded by a lower saw guard 18. Saw 10 further has a planar base 20 with an alignment notch 22.

Lower guard 18 exposes the lower portion of blade 14 in a manner that is well-known in the art. More specifically, the front edge of lower guard 18 engages the leading edge of a workpiece (not shown). As the saw passes further into a workpiece, lower guard 18 is rotated generally upwardly to expose the lower portion of the blade. Guard 18 is spring-loaded so that when saw 10 is disengaged from a workpiece, lower guard 18 returns to its lower blade covering position.

Upper guard 16 is provided with a clear viewing window assembly 26. Window 26 allows the user of saw 10 to view blade 14 as it exits a workpiece, thereby allowing the user to initially align and maintain alignment along the desired cutting path of saw 10. Window 26 can be mounted to guard 16 through a pivot arrangement 28 which allows upwardly pivoting of window 26 for cleaning of the interior surface of the window, as will be more fully described below.

Window assembly 26 is used to cover an aperture 30 formed in upper guard 16. Window 26 has a generally rectangular glass plate 34 which is generally sized to cover aperture 30. Plate 34 has a peripheral edge 36 which is comprised of a pair of width segments 38 and a pair of length segments 40. Plate 34 also has an upper surface 42 which, when window 26 is positioned over aperture 30, generally faces the operator and a lower surface 44 which, when window 26 is in position, generally faces blade 14. Plate 34 is preferably of a tempered glass type such that it has improved durability and resistance to breakage from projectiles being propelled through the cutting action of blade 14 moving through a workpiece or from external impacts to the tool housings. As is apparent, although plate 34 is shown as rectangular, other suitable shapes, such as an oval shape, could be used. Further, although plate 34 is shown as planar, it could also have a curved or arcuate shape.

Positioned on upper surface 42 of plate 34 is a plastic layer or film 46. Plastic layer 46 is also generally rectangular in shape and has a peripheral edge 48 comprised of a pair of width segments 50 and a pair of length segments 52. Plastic layer 46 is preferably formed of a transparent film constructed from multiple layers of polyester bonded together with cross-grained orientation. Layer 46 can be attached to plate 34 by a suitable pressure-sensitive adhesive.

Figure 2:
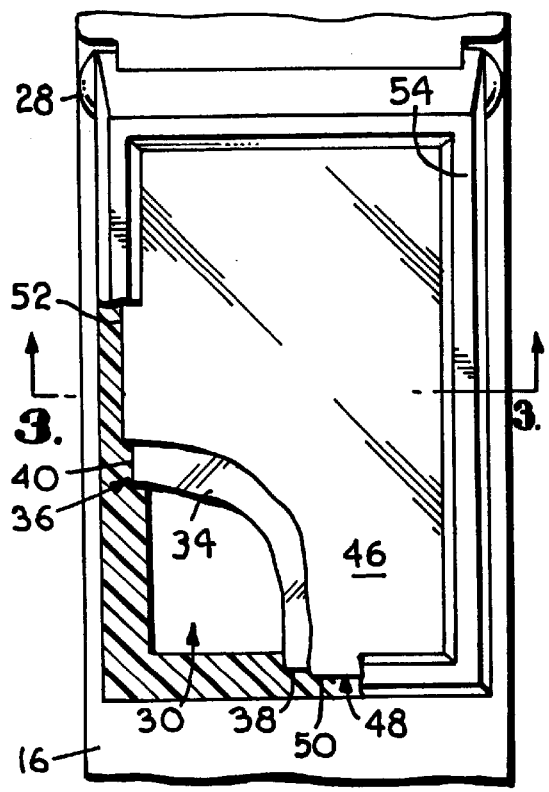
FIG. 2 is a top plan view of the viewing window shown in FIG. 1, parts being broken away and shown in cross section to reveal details of construction.
Figure 3:
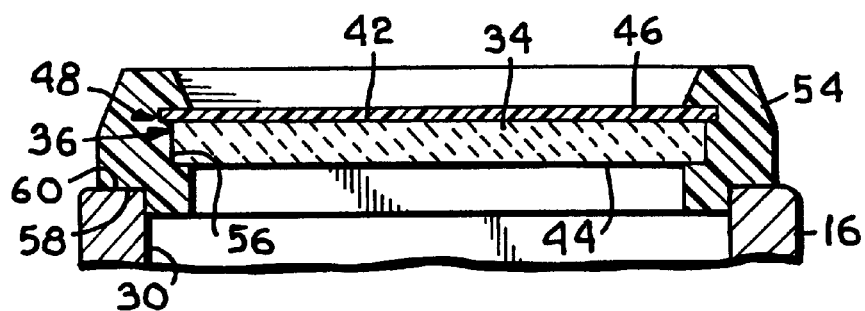
FIG. 3 is a cross-sectional view taken generally along lines 3—3 of FIG. 2 and showing the peripheral edges of the glass plate and plastic layer engaged by the frame.

As best shown in FIGS. 2 and 3, peripheral edge 48 of layer 46 extends outwardly a small distance beyond peripheral edge 36 of plate 34. This overhanging portion of layer 46 extends around the complete periphery of plate 34. The purpose of this overhang will be more fully described below.

A frame 54 engages the entire peripheral edges 36 and 48 of glass plate 34 and plastic layer 46, respectively. Peripheral edges 36 and 48 are received in a channel 56 formed by frame 54. Frame 54 is generally rectangular in shape and extends a small distance inwardly over the upper surface of plastic layer 48 and inwardly a small distance over the lower surface of glass plate 34 as best shown in FIG. 3. In this manner, peripheral edges 36 and 48 are firmly held by frame 54. Frame 54 is preferably formed of a synthetic polymeric/copolymeric material and is substantially rigid. Frame 54 can be formed with apertures to allow attachment of the finished window assembly 26 to upper guard 16 via pivot arrangement 28. Frame 54 is also formed with a generally rectangular edge 58 which engages a portion 60 of guard 16 that forms aperture 30.

The window assembly 26 described above is advantageous over prior window structures for numerous reasons. More specifically, having glass plate 34 oriented such that its lower surface is exposed to dust and other debris generated by blade 14 significantly reduces the possibility of dust collecting upon the window and obstructing the view of the operator. Glass plate 34 resists static-induced dust contamination of the window. Further, if the window is wiped clean with a cleaning cloth, as can be done if window 26 is pivoted upwardly about pivot arrangement 28, the glass plate is less likely to be scratched than if the window was made completely of a plastic material. Thus, utilizing the inner glass plate prevents marring or scratching of the window which would obstruct the view of the operator through the window, and thus hinder the effectiveness thereof.

Plastic layer 46 on upper surface 42 of plate 34 also offers great advantages. First of all, the plastic layer of film can be inexpensively colored or tinted to add diversity and styling to the window. Further, it is preferable to add a scratch-resistant coating to the upper surface of the layer. Additionally, if the glass should become broken or shattered due to contact with a projectile generated by blade 14 or due to external impact to the tool housing, layer 46 is designed to maintain the broken pieces of glass plate 34 within frame 32 due to the adhesive attachment of layer 46 with plate 34, thereby preventing aperture 30 from being exposed even if plate 34 becomes broken due to projectile or external impact damage.

The overlap of frame 54 over the glass peripheral edge 36 and plastic peripheral edge 48 serves to provide a suitable mounting structure for the combined plate and layer. It also serves to ensure that layer 46 is maintained on plate 34 and to prevent the peeling of layer 46 off of plate 34.

Window 26 is manufactured by first cutting or forming glass plate 34 to the proper size and shape. To provide maximum durability, the glass plate is then either chemically or heat strengthened. A transparent plastic layer, preferably a polyester film, is then applied over the entire upper surface of the glass plate. The layer is attached to the glass plate with a pressure-sensitive adhesive. Layer 46 can be precut to its shape prior to being applied to the plate 34, or can be cut to its desired shape after the layer has been applied to the plate. The plastic layer is formed such that its peripheral edge extends beyond the peripheral edge of the glass plate over the entire extent thereof or over the length of opposite edges. More specifically, the plastic layer is oversized so that its width segments and/or length segments extend outwardly beyond the width segments and/or length segments of the glass plate. The combined glass plate and plastic layer is then positioned in a mold and a synthetic polymeric/copolymeric material is injection-molded into the mold cavity to form the peripheral frame. The frame can also be injection-molded to have one or more pairs of apertures to allow connection to upper guard 16 via pivot arrangement 28. This injection-molding process allows frame 32 to overlap and engage peripheral edges 36 and 48 of plate 34 and layer 46, respectively. Thus, the combined structure of the glass plate and plastic layer is securely held within the frame due to the hardening of the frame about the peripheral edges thereof. The extension of the peripheral edge of the plastic layer outwardly from the peripheral edge of the glass plate aids in the orientation of the combined plate/layer structure within a mold cavity. More specifically, a person performing the manufacturing process can readily tell which surface is to be the upper surface of the window (the plastic layer) and which is to be the lower surface (the glass plate). Thus, the possibility of the window being inverted with the plastic layer facing the blade of the saw is reduced.

Figure 4:
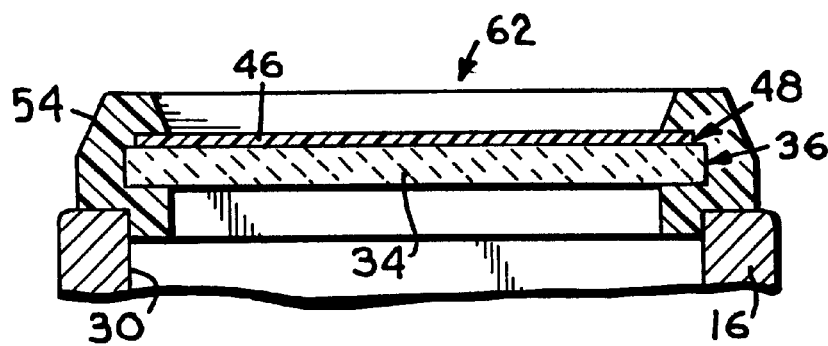
FIG. 4 is a view similar to FIG. 3 showing an alternative embodiment of the present invention.

With reference to FIG. 4, an alternative window assembly 62 is shown. Assembly 58 is generally the same as assembly 26, except that peripheral edge 48 of plastic layer 46 does not overlap peripheral edge 36 of glass plate 34. Window assembly 58 is manufactured according to the same methods as window assembly 26.

Figure 5:
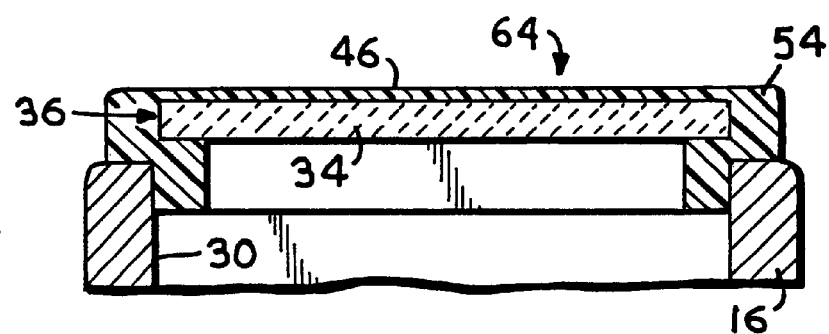
FIG. 5 is a view similar to FIG. 3, but showing a further alternative embodiment of the present invention.

With reference to FIG. 5, a further alternative window assembly 64 is shown. In assembly 64, plastic layer 46 is formed integrally with frame 54 during the molding process. More specifically, plastic layer 46 is formed at the same time as frame 54 through injection-molding. As is apparent, at least the material from which plastic layer 46 is formed must be transparent in nature. Therefore, both frame 54 and plastic layer 46 can be transparent in nature. However, it may be desirable to mold frame 54 with a material having a pigment and mold plastic layer 46 with a transparent material or to form a textured surface on frame 54 and a smooth transparent surface on layer 46.

From the foregoing, it will be seen that this invention is one well-adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims. Since many possible embodiments may be made of the invention without departing from the scope thereof, it is to be understood that all matters herein set forth or shown in the accompanying drawings are to be interpreted as illustrative and not in a limiting sense.

I claim:

1. A method of making a window assembly for a power tool, the power tool having a guard to shield a moving cutting tool, the window assembly adapted to be attached to the guard and to cover an aperture formed in the guard to allow an operator to view the cutting tool as it engages a workpiece, the method comprising:

positioning a plastic layer on the upper surface of a glass plate, the layer and the plate each having a peripheral edge and configured to generally cover the guard aperture; and molding a rigid frame to engage the layer peripheral edge and the plate peripheral edge, the rigid frame adapted to be attached to the guard so that the combined layer and plate generally cover the guard aperture.

2. The method of claim 1 further comprising:

securing said plastic layer to said glass plate with an adhesive.

3. The method of claim 1, wherein the glass plate is generally planar.

4. The method of claim 1, wherein the rigid frame is formed to generally surround the plate peripheral edge and the layer peripheral edge.

5. The method of claim 1, wherein the layer is positioned on the plate so that the layer peripheral edge extends outwardly beyond the plate peripheral edge.

6. A method of making a window assembly for a power tool, the power tool having a guard to shield a powered cutting tool, the window assembly adapted to be attached to the guard and to cover an aperture formed in the guard to allow an operator to view the cutting tool as it engages the workpiece, the method comprising:

providing a glass plate with an upper surface, a lower surface, and a peripheral edge; and molding a frame to engage and hold the peripheral edge and so that the frame has a transparent portion that at least partially covers the upper surface of the plate.

7. The method of claim 6, wherein the glass plate is generally planar.

8. The method of claim 6, wherein the frame is formed to generally surround the plate peripheral edge.

9. The method of claim 6, wherein the transparent portion of the frame completely covers the upper surface of the plate.

10. A method of making a window assembly for a power tool, the power tool having a guard to shield a moving cutting tool, the window assembly adapted to be attached to the guard and to cover an aperture formed in the guard to allow an operator to view the cutting tool as it engages a workpiece, the method comprising:

obtaining a glass plate with an upper surface, a lower surface and a peripheral edge;

obtaining a plastic layer with an upper surface, a lower surface and a peripheral edge;

positioning the plastic layer on the upper surface of the glass plate, wherein the lower surface of the plastic layer and the upper surface of the glass plate abut each other; and molding a frame around the glass plate and plastic layer combination such that the frame engages at least a portion of the peripheral edges of both the glass plate and the plastic layer, the frame facilitating coupling of the window assembly to the guard.

11. The method of claim 10, wherein the peripheral edge of the plastic layer is larger than the peripheral edge of the glass plate such that a portion of the plastic layer overhangs the peripheral edge of the glass plate, and wherein the frame engages the upper and lower surfaces of the plastic layer as well as the lower surface of the glass layer.

* * * * *